(12) United States Patent
Velayutham

(10) Patent No.: US 9,274,819 B2
(45) Date of Patent: Mar. 1, 2016

(54) PERFORMING GARBAGE COLLECTION USING A VIRTUAL THREAD IN OPERATING SYSTEM WITHOUT KERNEL THREAD SUPPORT

(71) Applicant: HEWLETT-PACKARD DEVELOPMENT COMPANY, L.P., Houston, TX (US)

(72) Inventor: Thirusenthilanda Arasu Velayutham, Chennai (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 367 days.

(21) Appl. No.: 13/846,992

(22) Filed: Mar. 19, 2013

(65) Prior Publication Data

US 2014/0289725 A1 Sep. 25, 2014

(51) Int. Cl.
*G06F 9/455* (2006.01)
*G06F 9/54* (2006.01)
*G06F 12/02* (2006.01)

(52) U.S. Cl.
CPC ............ *G06F 9/45504* (2013.01); *G06F 9/544* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 5,555,385 A * | 9/1996 | Osisek | ............................. | 711/1 |
| 6,212,608 B1 * | 4/2001 | Bak | .............................. | 711/152 |
| 6,240,440 B1 * | 5/2001 | Kutcher | ............... | G06F 9/4856 718/102 |
| 6,282,702 B1 * | 8/2001 | Ungar | ................. | G06F 9/45504 717/148 |
| 6,510,437 B1 * | 1/2003 | Bak et al. | .............. | G06F 9/4428 707/704 |
| 6,760,825 B1 * | 7/2004 | Sexton et al. | ......... | G06F 9/4435 711/170 |
| 6,854,114 B1 * | 2/2005 | Sexton et al. | ........... | G06F 9/485 709/200 |
| 7,234,139 B1 * | 6/2007 | Feinberg | ............. | G06F 9/45504 718/1 |
| 7,529,786 B2 | 5/2009 | Andreasson | | |
| 7,552,306 B2 * | 6/2009 | Madhavarao et al. | ........ | 711/170 |
| 7,716,258 B2 * | 5/2010 | Dussud | ......................... | 707/813 |
| 7,933,937 B2 | 4/2011 | Delsart et al. | | |
| 2002/0073135 A1 * | 6/2002 | Meyer | ................... | G06F 9/4843 718/107 |

(Continued)

OTHER PUBLICATIONS

Dave Probert and John Bruno. Implementing operating systems without kernels. Technical Report TRCS95-24, University of California at Santa Barbara, Dec. 1995.*

(Continued)

*Primary Examiner* — Meng An
*Assistant Examiner* — James J Lee
(74) *Attorney, Agent, or Firm* — Hewlett Packard Enterprise Patent Department

(57) ABSTRACT

Techniques are provided to allow concurrent operation of threads in an operating system that does not support kernel threads. A first process may create a first thread. The first thread may create a second process. The second process is granted access to a portion of the address space of the first thread. Synchronization information is passed between the first thread and the second process over a communications channel.

20 Claims, 7 Drawing Sheets

(56) References Cited

U.S. PATENT DOCUMENTS

| | | | |
|---|---|---|---|
| 2003/0088604 A1* | 5/2003 | Kuck et al. | G06F 9/4843 718/1 |
| 2003/0217087 A1* | 11/2003 | Chase et al. | G06F 9/443 718/1 |
| 2004/0181562 A1 | 9/2004 | Findeisen | |
| 2005/0066149 A1* | 3/2005 | Kanade | G06F 9/4881 712/1 |
| 2005/0262512 A1* | 11/2005 | Schmidt et al. | G06F 9/465 719/310 |
| 2006/0248200 A1* | 11/2006 | Stanev | H04L 67/14 709/227 |
| 2007/0061791 A1* | 3/2007 | Hartikainen | G06F 9/4812 717/148 |
| 2008/0189709 A1* | 8/2008 | Amin | G06F 9/5066 718/102 |
| 2010/0011357 A1* | 1/2010 | Ramamurthy | 718/1 |
| 2012/0166498 A1 | 6/2012 | Gracie et al. | |
| 2013/0263121 A1* | 10/2013 | Franke et al. | G06F 9/45537 718/1 |

OTHER PUBLICATIONS

Bernd Schöbel—Multi-level Parallelization of Graph-Mining-Algorithms—Article—Nov. 2, 2009—Department für Informatik Friedrich-Alexander-Universität Erlangen Nürnberg.

Lo, C.T.D. et al.—A Multithreaded Concurrent Garbage Collector Parallelizing the New Instruction in Java—Article—pp. 1-6—Department of Computer Science Illinois Institute of Technology Chicago, IL. 60616-3793, USA; 2002 IEEE.

\* cited by examiner

PERFORMING GARBAGE COLLECTION USING A VIRTUAL THREAD IN OPERATING SYSTEM WITHOUT KERNEL THREAD SUPPORT

BACKGROUND

In computer programming, threads allow for a single program process to create multiple sub-processes. Each thread shares the same address space as the overall process, and thus may access all memory allocated to the process. The threads operate to perform some task. From the perspective of the computer program, each thread is running concurrently. Thus, the computer program may create multiple threads to perform multiple tasks, and from the perspective of the computer program, those tasks are performed in parallel.

DETAILED DESCRIPTION

Figure 1:
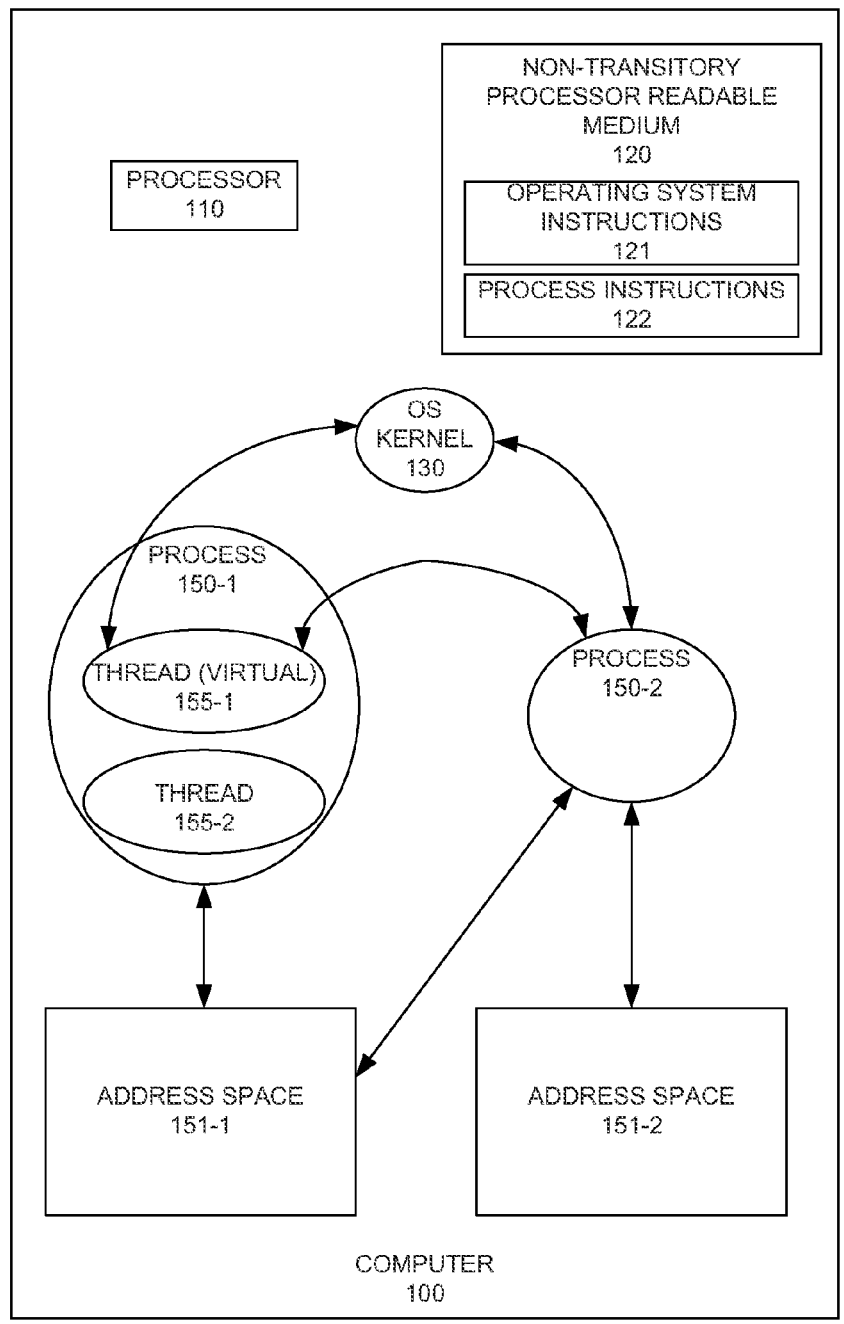
FIG. 1 is a block diagram of an example computer system using user threads in an operating system that does not support kernel threads according to the techniques described herein.

Although threads appear to a computer program to be running in parallel, actual operation of the threads is dependent on the support provided by the operating system. In general, there are two different types of threads. The first type is a user thread. With user threads, the computer program itself, often with the assistance of a thread library, manages the threads. The computer program creates and destroys threads, and is responsible for scheduling which thread will run. From the perspective of the operating system, the entire computer program, also referred to as a schedulable entity, appears to be a single schedulable entity, regardless of the number of threads created. As such, the operating system schedules the process to run, and the process itself decides which thread will run. As should be clear, only one thread at a time is actually running.

The second type of thread is a kernel thread. A kernel thread is a thread that is provided by the kernel of the operating system. From the perspective of the operating system, each kernel thread is an independently schedulable entity. Thus, if a computer system contains multiple processors, or multiple cores per processor, the operating system may schedule kernel threads on individual processors and/or cores independently. Because the processors and/or cores operate somewhat independently, as many kernel threads as there are processors and/or cores can be scheduled to run simultaneously.

Some operating system provide for the capability of mapping user threads to kernel threads. Thus, a user thread may be mapped to a kernel thread and becomes independently schedulable by the operating system. As such, the user threads may actually operate concurrently to the extent that processors and/or cores are available. Each user thread may be mapped to a kernel thread and the operating system is responsible for assigning the kernel threads to a processor and/or core.

However, a problem arises in operating systems that do not support kernel threads. As mentioned above, to the operating system, a process utilizing user threads appears as a single schedulable entity. Thus, the process runs on a single core of a single processor, regardless of the number of processors and/or cores that may be available. Further exacerbating the problem is that user threads are typically non-preemptive. This means that once a user thread has started to run, it will continue to run until the thread voluntarily decides to relinquish control back to the process, which may then schedule a different thread to run. If the thread does not voluntarily relinquish control, the thread will continue to run until complete. During this period of time, all other user threads are blocked from execution.

The techniques described herein overcome the problems caused by using user threads on an operating system that does not support kernel threads. When a new user thread is created, a virtual thread is created in the process to represent the new user thread. A second process is then created to perform the task assigned to the new user thread. The second process, because it is a separate process from the first, is independently scheduled by the operating system. Thus, both the first and second processes may actually be assigned to different processors and/or cores, and execute at the same time, thus behaving like kernel threads.

In addition, several modifications are made to the operating system and process to account for the fact that the first and second process are independent processes, each running in their own address space. A communications channel is established between the virtual thread created in the first process and the second process. Information needed for proper synchronization between the first and second processes is passed over this communications channel. In addition, the operating system is modified to allow for access of the address space allocated to the first process by the second process. Finally, the first process is modified such that requests to allocate new memory resources are assigned memory resources that are accessible to both the first and second process.

FIG. 1 is a block diagram of an example computer system using user threads in an operating system that does not support kernel threads according to the techniques described herein. The computer 100 may include a processor 110. Coupled to the processor may be a non-transitory processor readable medium 120 containing instructions thereon, which when executed by the processor cause the processor to implement the techniques described herein. The medium 120 may include operating system instructions 121 which implement an operating system that does not support kernel threads according to techniques described herein. The medium 120 may also include process instructions 122 which implement processes that may utilize user threads in accordance with the techniques described herein.

The computer 100 may run an operating system 130 according to the instructions 121. The operating system may control the hardware of the computer, including managing processes. Managing processes may include scheduling which process is to run, and in cases of multiple processors or multiple cores on a processor, managing on which processor and/or core the process is to run. The operating system may also manage the memory address space used by each process. The operating system may provide an address space to each running process and ensures that a process only accesses memory that the process is entitled to access.

The computer may also include a process 150-1. Process 150-1 may be a process that utilizes user threads. For example, process 150-1 includes user threads 155-1, 2. For purposes of this description, two types of user threads are described. The first is a normal user thread, such as thread 155-2. A normal thread executes within the context of the process that created the thread, using the address space assigned to the process, and is scheduled by the process itself.

The second type of thread is a virtual thread, such as thread 155-1. A virtual thread is one in which the actual execution of the task assigned to the virtual thread is performed by a separate process. The process that creates a virtual thread is unaware that the actual task execution is being performed by a separate process. The process communicates with a virtual thread just as it would communicate with a normal thread. The virtual thread conveys any needed synchronization information to the process that is actually executing the task assigned to the virtual thread.

For each process 150-1,2, the operating system creates address space 151-1,2 respectively. Normally, a process is limited to accessing the memory address space associated with the process. For example, the threads 155-1,2 in process 150-1 would be limited to address space 151-1, while process 150-2 would be limited to address space 151-2. However, techniques provided herein allow for access of the address space of one process by another process.

In operation, a first process, such as process 150-1 may be started. The process 150-1 may create a first thread 155-1, that is a virtual thread. The process may also create normal threads such as thread 155-2. For purposes of this description, only a single normal thread and a single virtual thread is shown, however it should be understood that the techniques described herein are applicable regardless of the number of normal and virtual threads that are created.

Upon creation of the virtual thread 155-1, the virtual thread may cause a second process 150-2 to be created. As explained above, the second process exists in its own address space 151-2, and is scheduled by the operating system independently. Thus, the first and second processes are independent, and in computers with multiple processors and/or cores, the two processes may execute at the same time. The virtual thread may establish a communications channel with the second process. Through this communications channel, the virtual thread and the second process may exchange information needed for synchronization.

In order to execute the task assigned to the second process by the virtual thread, the second process may need access to the address space of the first process. Upon creation of the second process, the virtual thread may send an indication to the OS to allow the second process to access certain portions of the address space of the first process. The OS upon receiving such a request may enable the second process to access portions of the address space of the first process. In addition, as the first process is running, there may be a need for the second process to be made aware of new portions of the address space of the first process that need to be accessed by the second process. The first process, through the virtual thread, may send this information to the second process over the communications channel. The second process may then request that the operating system grant access to the new portions of the address space of the first process to the second process. The operating system may grant access to those new portions of the address space to the second process.

In addition to being used to pass information regarding which portions of the address space of the first process are being shared with the second process, the communications channel may also be used for additional functions. For example, as has been described above, the second process is granted access to portions of the first process's address space. Because the two processes are running independently, a conflict may arise if both processes attempt to alter the same data. In a system which supports kernel threads, such conflicts may be avoided through the use of locks, such as thread mutex and thread wait/notify locks. When one thread releases a lock on a portion of memory, a thread that is waiting for the lock for that portion of memory may be notified. Thus, the problem of concurrent modification of the address space is avoided.

However, such techniques do not work across processes. In order to overcome this problem, the communications channel is used to communicate when one process has released a lock on a portion of the address space. For example, the first process may see that a lock on a portion of memory is available, and may acquire the lock. If the second process tries to acquire the lock on the same portion of memory, it may see that the lock has already been acquired by a different process. When the first process is done with the lock, the first process may send a message over the communications channel to the second process indicating the lock is free. The second process may then acquire the lock.

Furthermore, the communications channel may be used to communicate actions that the first process desires the second process to complete. As explained above, the first process creates a virtual thread. From the perspective of the first process, an instruction may be sent to the virtual thread to execute some operation, just as if it were being sent to a normal thread. However, the virtual thread does not actually execute any operations, but rather passes that instruction to perform an operation on to the second process over the communications channel. Likewise, when the second process completes some operation, a message may be sent back to the virtual thread. The virtual thread may report this completion to the first process just as if it were a normal thread. The first process is thus unaware of if the operation were completed by a normal thread operating as part of the first process or by an independent second process.

Figure 2:
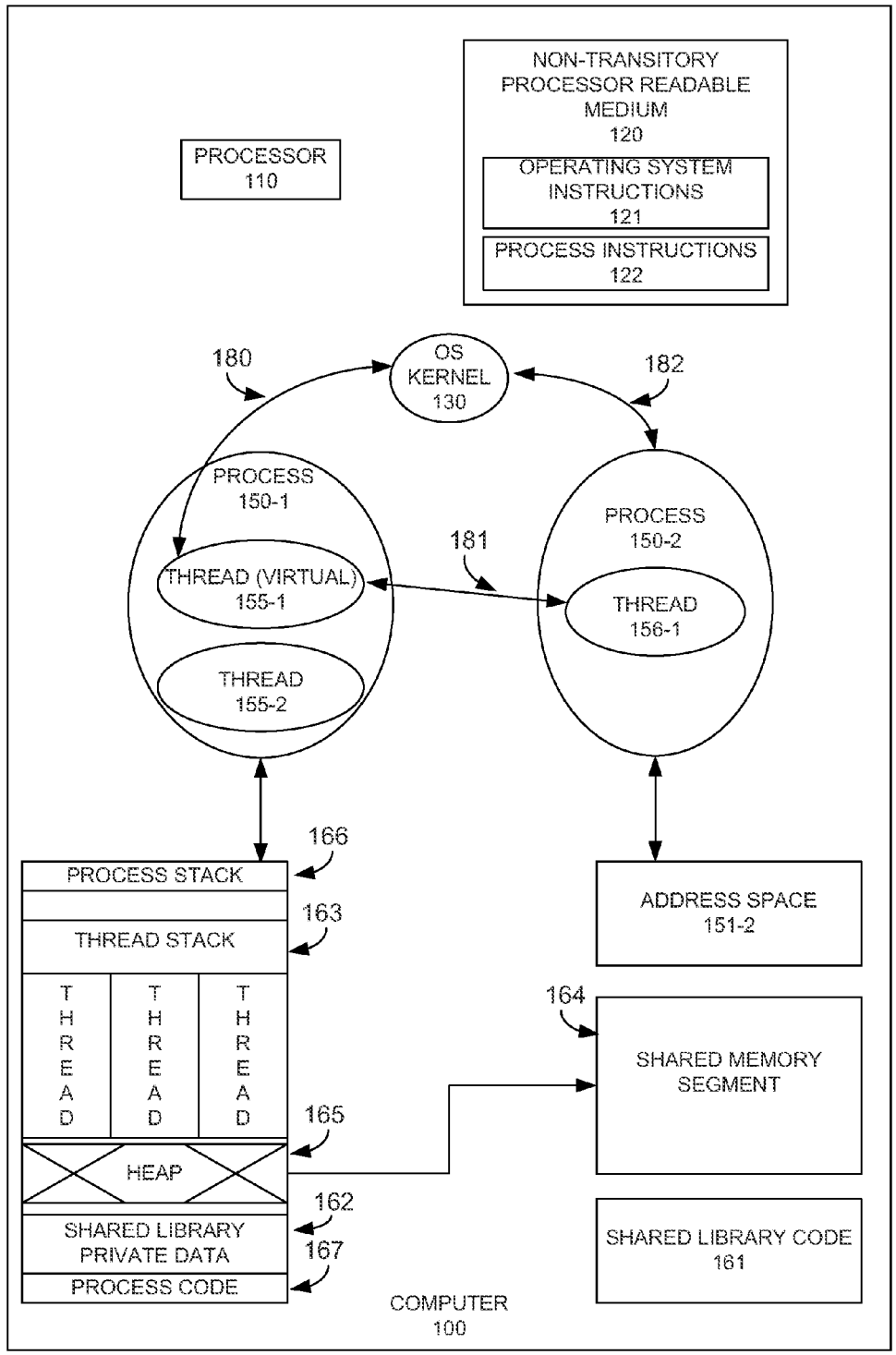
FIG. 2 is another block diagram of an example computer system using user threads in an operating system that does not support kernel threads according to the techniques described herein.

FIG. 2 is another block diagram of an example computer system using user threads in an operating system that does not support kernel threads according to the techniques described herein. FIG. 2 is generally the same as FIG. 1, with a little more detail provided about the address spaces. A process may use a shared library. For example, the pthread library in Unix like systems is used to provide threads. A shared library typically has two parts, a code part and a data part. The code part 161 is shared by all running processes. Each process has its own copy of the data part 162. It may be necessary for the second process to access data contained in the data part 162 of a shared library that belongs to the first process. When the virtual thread is created, the virtual thread may request 180 that the operating system grant access to the data portion of the shared library to the second process. The operating system may then make that portion of the address space accessible to both the first and second process. Absent this step, any attempt by the second process to access the data portion of the shared library of the first process would result in an operating system fault.

FIG. 2 also includes a thread stack portion 163. The thread stack portion may be used to keep maintain a program stack for each thread that has been created by the first process. The second process may need to access this stack. However, threads may be created and destroyed constantly by the first process, with the stacks in different locations. To overcome this problem, upon creation of a new thread, the virtual thread associated with the first process sends 181 to the second process the start address of the stack allocated for the newly created thread over the communications channel. The second process may then send a request 182 to the operating system to grant access to the specified portion of the address space of the first process. The operating system may then grant access to the second process. Likewise, when a thread is destroyed, the virtual thread may send an indication over the communications channel to the second process. The second process may then request the operating system to discontinue sharing of the portion of the address space of the first process used for the stack of the thread being destroyed.

Although the thread stack is shown with reference to the first process, it should be understood that the second process has a similar memory structure. A conflict may arise if the same addresses in the address space are used for thread stacks in both processes. For example, when the second process is started, a thread 156-1 may be created in the second process to handle the communications channel to the virtual thread in the first process. This helper thread is assigned a stack in the address space of the second process. However, it must be ensured that there is no conflict with the address used for the stack of the helper thread and of any other threads created in the first process. In other words, it should be ensured that the address used for the stack of the helper thread is not used by any newly created thread stack in the first process.

In order to overcome this problem, when the virtual thread 155-1 is created, the address of the stack for the virtual thread is passed to the second process over the communications channel. When the second process creates the helper thread 156-1, the second process sends a request to place the thread stack for the helper thread at the same address, but in different address spaces, as that of the virtual thread. Thus, because the address of the stack of the virtual thread will not be allocated to a new thread (i.e. it can't be assigned to a new thread, because it is already in use by the virtual thread) in the first process, this ensures that a new thread in the first process does not contain a stack space that overlaps the stack space of the helper thread.

FIG. 2 also shows a shared memory segment 164. When the first process allocates new memory, absent techniques described herein, the memory is allocated from the heap space 165 of the first process. However, memory allocated from the heap of a process cannot be shared with another process. Thus, the second process would not be able to access newly allocated memory. To overcome this problem, the first process sets up a shared memory segment 164. When the first process wishes to allocate new memory, the allocation is done from the shared memory segment as opposed to the heap. The second process is then able to attach to the shared segment and is able to access the newly allocated memory.

In addition to the memory spaces that may be shared between the first and second processes, each process may also contain process local storage. For example, each process may contain storage for a process code 167 (i.e. the instructions for the process) and a process stack 166 for the process. Each process may include process local storage. For example, the second process may have process local storage within its own address space 151-2. This memory space is process specific, and thus is not shared between processes. The process specific memory space may be used to store data that the other processes need not be aware of, or it may have different values, depending on the context of the thread. For example, a thread may have code to check to see if it is a real thread or a virtual thread. This code would read a value in the process specific memory space. Depending on the value stored, the process may determine if the thread is a real thread or a virtual thread. As should be clear, this memory location cannot be shared, as the result is dependent on the particular process in which the thread is running.

In order to gain a better understanding of the techniques described above, an example of a process utilizing user threads on an operating system that does not support kernel threads may be helpful. However, it should be understood that this is merely an example to aid in understanding, and the techniques described herein are not limited to the example presented. In the JAVA programming language, a JAVA program cannot be directly executed by the Operating System. Rather, JAVA provides a virtual machine, referred to as the JAVA Virtual Machine (JVM). The Operating System starts the JVM as a process and the JVM executes the program. The JVM on startup creates few daemon threads like a garbage collector thread. After the JVM initializes itself, the program itself is executed as a thread running within the JVM process. The JAVA program can create additional user threads during execution to utilize the multiple-core/processors available in the system. As should be clear, many user threads may run within the JVM at the same time.

The JAVA programming language does not provide for a way for a program to return memory to the JVM. Thus, once a JAVA program has allocated memory for an object, that memory cannot be freed by the program, even if it is no longer needed, and in fact even if the JAVA thread that allocated the memory completes. Instead, the JVM itself is responsible for returning unused memory back to the pool of memory that is available for use. This task of returning unused memory is generally referred to as garbage collection.

In an operating system that utilizes kernel threads, the JVM may create a garbage collection thread. This thread operates concurrently with all other JAVA threads, reclaiming memory that is no longer in use. This means that the garbage collection thread needs to access the memory of the running JAVA program, to determine when the program is no longer using a portion of memory. In addition, the garbage collection thread needs to know when a JAVA program creates an additional thread, so that it can share the thread stack or when a thread ends so that it can un-share the thread stack. In an operating system that supports kernel threads, there is no issue. The garbage collection thread has access to all needed memory and can be notified of thread creation/destruction via normal thread communications. Furthermore, all synchronization problems are already handled via thread synchronization procedures.

When run in an operating system that does not support kernel threads, the entire JVM (including JAVA program threads) appears to be a single threaded process for the Operating System. Thus, at any given time, only one thread may be run. The garbage collection thread may take a long time to complete, and this time increases as the amount of memory increases. Furthermore, the garbage collection thread is not a "well behaved" thread. As mentioned above, user threads are non-preemptive. This means that a thread continues to run until it completes its task or voluntarily releases the processor so that a different user thread may run. Here, the garbage collection thread will run until its task is complete. During this period of time, all other user threads, such as the threads created to run the JAVA program, are not allowed to run. Thus, the entire JAVA application appears to freeze until the garbage collection process is completed. Given the size of memory, this may cause a JAVA program to appear frozen for a few microseconds to tens of seconds.

The techniques described herein may be used to overcome this problem. Instead of starting a garbage collection thread, the JVM may start a garbage collection virtual thread. The garbage collection virtual thread may cause a second process, the garbage collection process, to be created. When the garbage collection process is started, the address of the stack of the garbage collection virtual thread may be sent to the second process. The second process may create a helper thread to create a communications channel between the virtual thread and the helper thread. The helper thread may request its stack be allocated at the received address, thus avoiding the problems described above. When the JVM sends commands to the garbage collector virtual thread, those commands are received and forwarded to the garbage collector process via the helper thread. The JVM process need not be aware that garbage collection is being done by a virtual thread that has created a second process to actually perform the work.

When the JVM creates a new thread or destroys an existing thread (e.g. because the application has done so) an indication of such is sent to the garbage collection virtual thread. Upon receipt of the indication by the garbage collection virtual thread, the virtual thread may send a command over the communications channel to the helper thread executing as part of the garbage collector process. This command may include the address of the stack used for the newly created/destroyed thread. The garbage collection process may then request that the operating system grant/revoke access to the memory space being utilized for the stacks of the newly created/destroyed threads.

When the JVM allocates new memory space for objects, this space is allocated from a shared memory segment, as opposed to the heap. The garbage collection process can attach to the shared memory segment, and as such has access to the memory. In order to overcome synchronization problems, when a piece of memory that can be accessed by more than one thread/process is to be modified, a lock may be placed on that memory. Other threads/processes will not attempt to modify that memory when there is a lock. When the lock is clear, all other threads, or at least threads that are waiting for the lock, will be notified. This includes notifications to virtual threads. The virtual threads may then send a message over the command channel to the helper thread to indicate the lock is now available. The same process also occurs for when the garbage collector process releases a lock. The helper thread sends a command to the garbage collector virtual thread indicating the lock has been released. The garbage collector virtual thread may then notify threads running within the JVM that the lock has been released.

The garbage collector process runs essentially unchanged from the function it performed when it operated as a thread within the JVM. The garbage collector process is able to access all memory it would have been able to access as part of the JVM. Furthermore, the garbage collector process receives all of the notifications of thread creation/destruction without the JVM realizing that it is a separate process. Finally, the locking mechanism for locking areas of memory shared between threads appears from the perspective of the garbage collection process to run just as it would have within the JVM. In short, the garbage collection process is now able to run just as if it were a user thread in a JVM running on an operating system that supported kernel threads.

Figure 3:
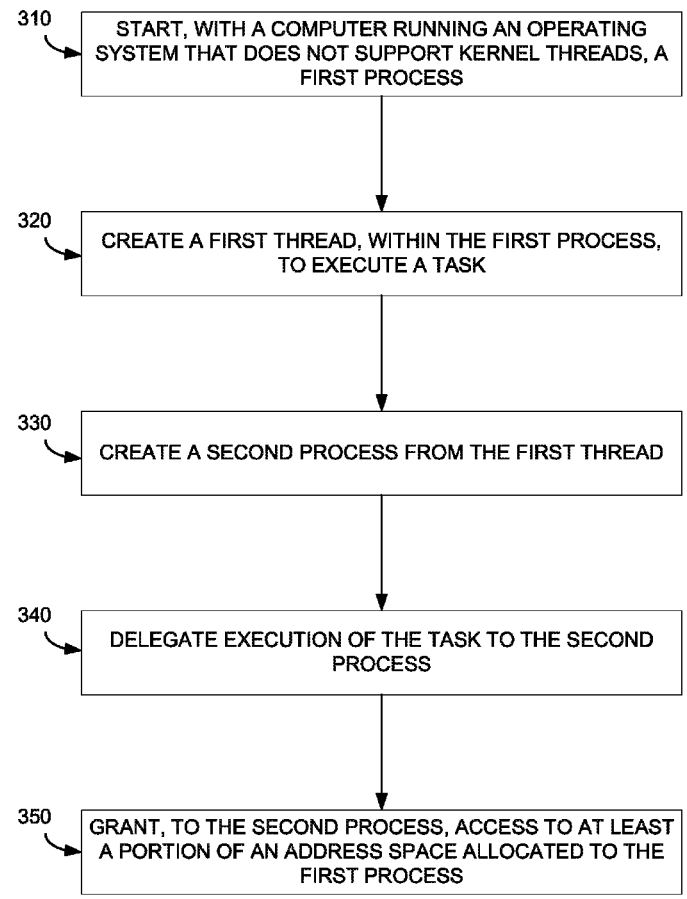
FIG. 3 is an example of a high level flow diagram for creating a user thread in an operating system that does not support kernel threads according to the techniques described herein.

FIG. 3 is an example of a high level flow diagram for creating a user thread in an operating system that does not support kernel threads. In block 310, a first process may be started with a computer that runs an operating system that does not support kernel threads. In block 320, a first thread may be created within the first process to execute a task. As described above, the first thread may be a virtual thread which does not actually execute the task, but rather is used for communication between the first process and the process that will actually execute the task.

In block 330, a second process may be created from the first thread. The second process may be a process that is independent of the first process, and as such is independently scheduled by the operating system. In block 340, execution of the task assigned to the first thread may be delegated to the second process. In other words, the second process is created to actually perform the task for which the first thread was created. In block 350, the second process may be granted access to at least a portion of the address space of the first process.

As explained above, kernel threads associated with the same process all reside in the same address space. Thus, a thread in a process is automatically able to access everything in the processes address space. Here, since the second process resides in its own address space, the second process is granted access, by the operating system, to portions of the first processes address space. Absent the techniques described herein, such access would normal be considered a fault condition by an operating system.

Figure 4A:
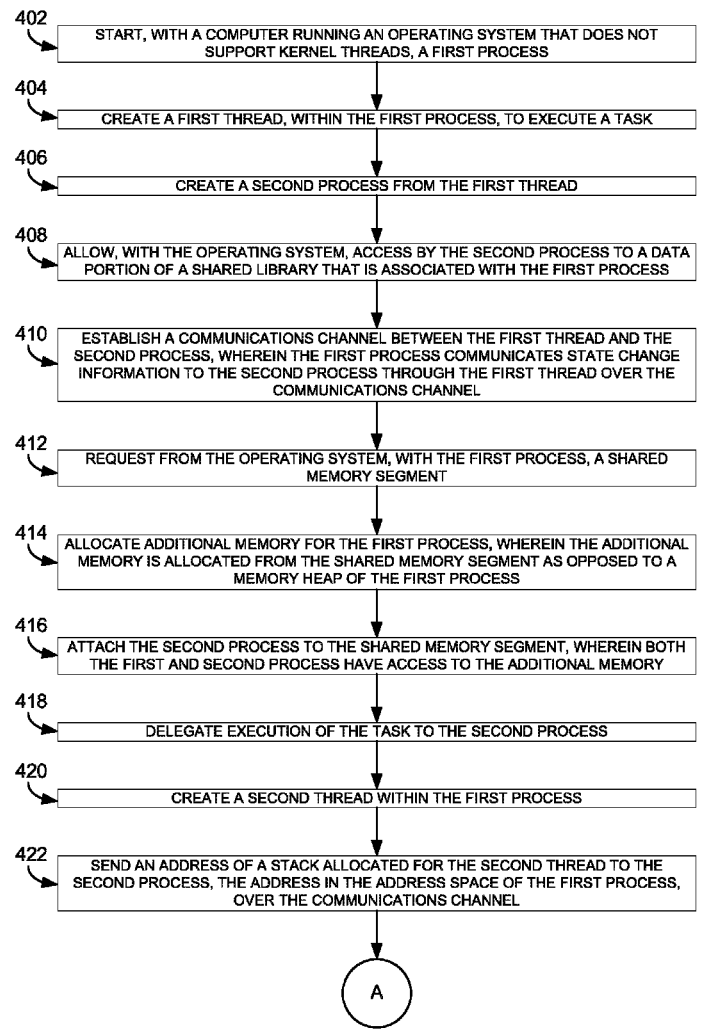
FIGS. 4(a-b) are another example of a high level flow diagram for creating a user thread in an operating system that does not support kernel threads according to the techniques described herein.
Figure 4B:
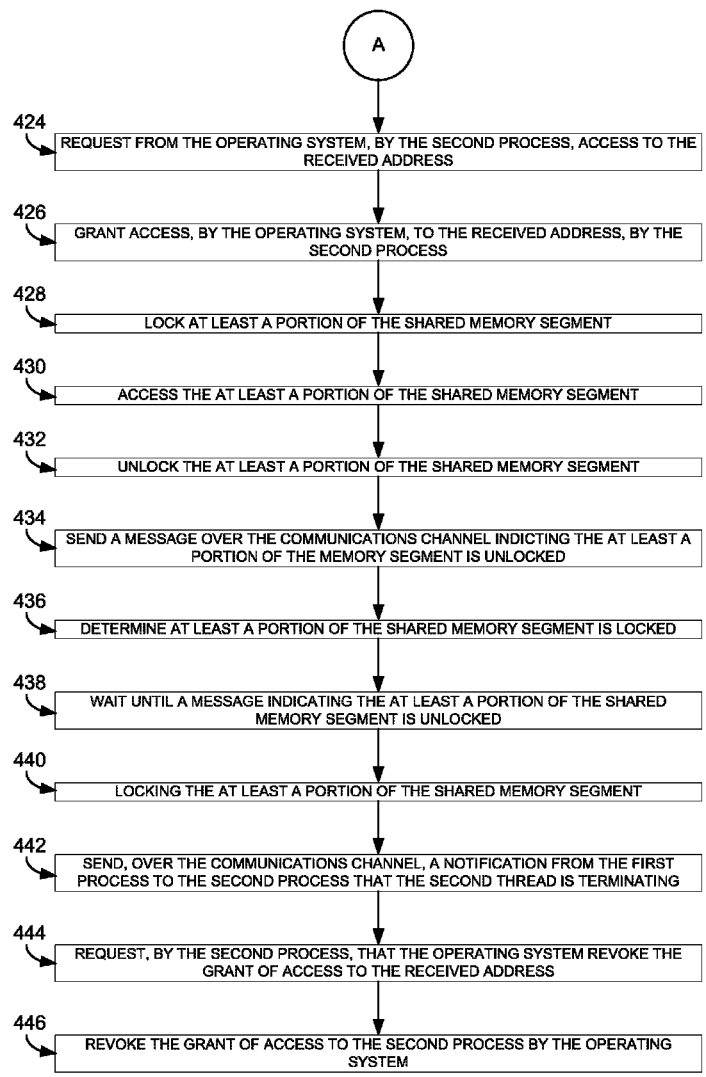

FIGS. 4(*a-b*) are another example of a high level flow diagram for creating a user thread in an operating system that does not support kernel threads according to the techniques described herein. In block 402, a computer running an operating system that does not support kernel threads may start a first process. In block 404, a first thread within the first process may be created to execute a task. In block 406, a second process may be created from the first thread. In block 408, the operating system may allow access by the second process to a data portion of a shared library that is associated with the first process. In other words, the second process may be granted access to portions of the shared library that can normally only be accessed by the first process.

In block 410, a communications channel between the first thread and the second process may be established. The first process may communicate state change information to the second process through the first thread, over the communications channel. In block 412, the first process may request from the operating system a shared memory segment. In block 414, the first process may allocate additional memory for the first process. The additional memory may come from the shared memory segment, as opposed to the memory heap of the first process. In block 416, the second process may attach to the shared memory segment. Both the first and second process may have access to the shared memory segment. This is unlike allocations from the heap of the first process, which would only be accessible to the first process.

In block 418, execution of the task may be delegated to the second process. As described above, the second process is created to execute the task. In block 420, a second thread may be created within the first process. This thread may be used to perform some function in the first process. For example, in the JVM case, the second thread may be a JAVA thread created by the JAVA program. In block 422, the address of the stack allocated for the second thread may be sent to the second process over the communications channel. In block 424, the second process may request access to the received address from the operating system. Thus, the second process may have access to the stack of the thread created in the first process. In block 426, access to the stack may be granted by the operating system to the second process.

In block 428, at least a portion of the shared memory segment may be locked. For example, if a thread in the first or second process wishes to manipulate data in the shared memory segment, this data must first be locked in order to prevent another thread from simultaneously trying to alter the same data. In block 430, the at least a portion of the shared memory segment may be accessed. For example, a data value may be written to a memory location within the shared segment. In block 432, the at least a portion of the shared memory segment may be unlocked. Thus, the at least a portion of the shared memory segment is available for any thread to write data to it. In block 434, a message may be sent over the communications channel indicating the at least a portion of the shared memory segment is now unlocked. As mentioned above, threads within a process are able to receive notifications directly when a lock is released, because those threads are all within the same process. However, for threads that are in a different process, the notification is explicitly done through a message sent over the communications channel.

In block 436, a thread may determine that at least a portion of the shared memory segment is locked. For example, some other thread may have locked the portion of the shared memory segment in order to write data. In block 438, the thread may wait until a message indicating the at least a portion of the shared memory segment is unlocked is received. In block 440, the waiting thread may then lock the at least a portion of the shared memory segment.

In block 442, a notification from the first process to the second process that the second thread is terminating may be sent over the communications channel. In block 444, the second process may request that the operating system revoke the grant of access to the received address. In other words, the second process is requesting the access granted in block 424 be revoked. In block 426, the operating system may revoke the grant of access to the second process.

Figure 5:
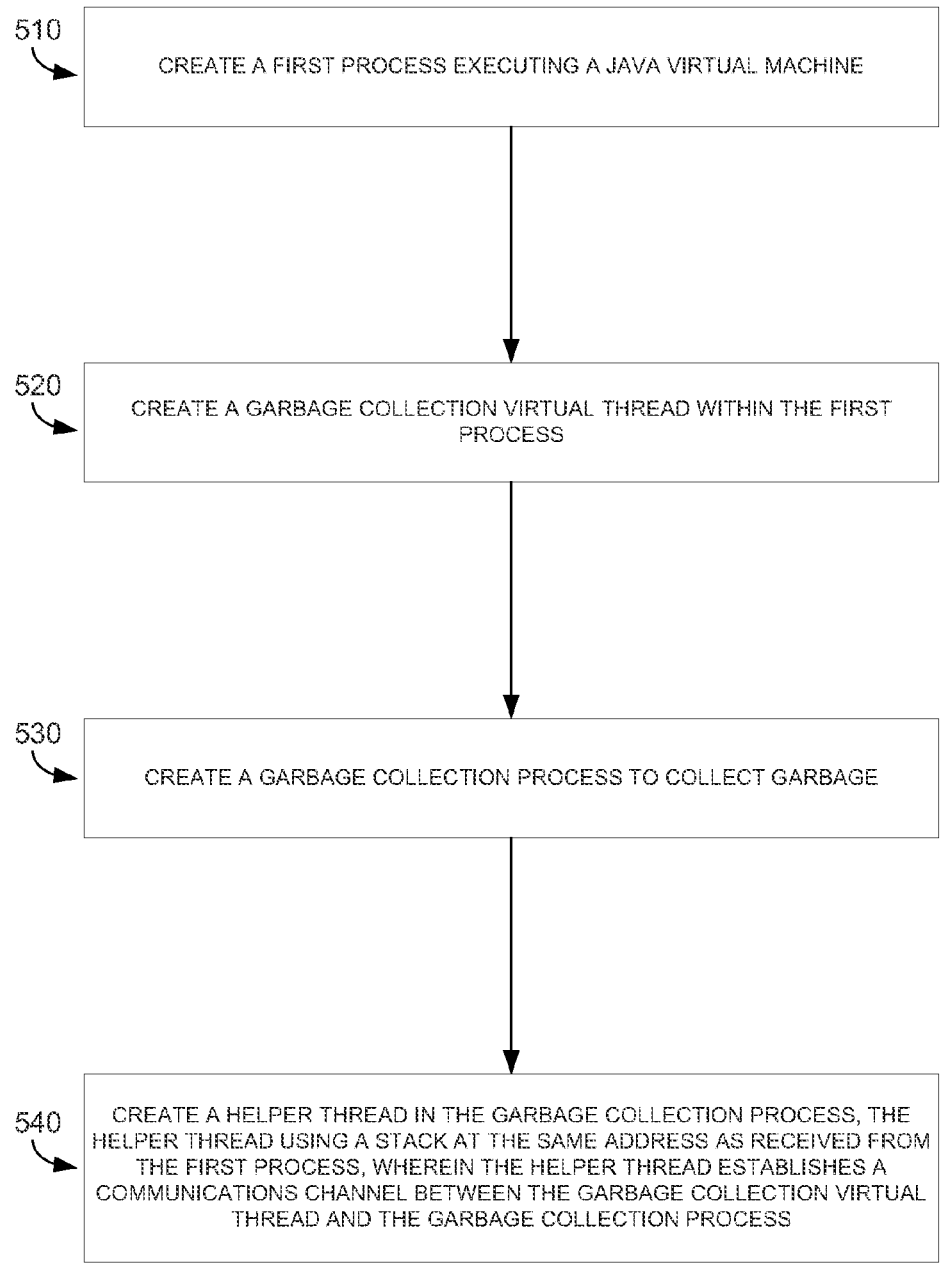
FIG. 5 is an example of a high level flow diagram for creating a JAVA virtual machine utilizing the techniques described herein.

FIG. 5 is an example of a high level flow diagram for creating a JAVA virtual machine utilizing the techniques described herein. In block 510, a first process executing a JAVA virtual machine may be created. In block 520, a garbage collection virtual thread may be created within the first process. In block 530, a garbage collection process may be created. In block 540, a helper thread may be created in the garbage collection process. The helper thread may use the same stack address as the garbage collection virtual thread. The helper thread may establish a communications channel between the garbage collection virtual thread and the garbage collection process.

Figure 6:
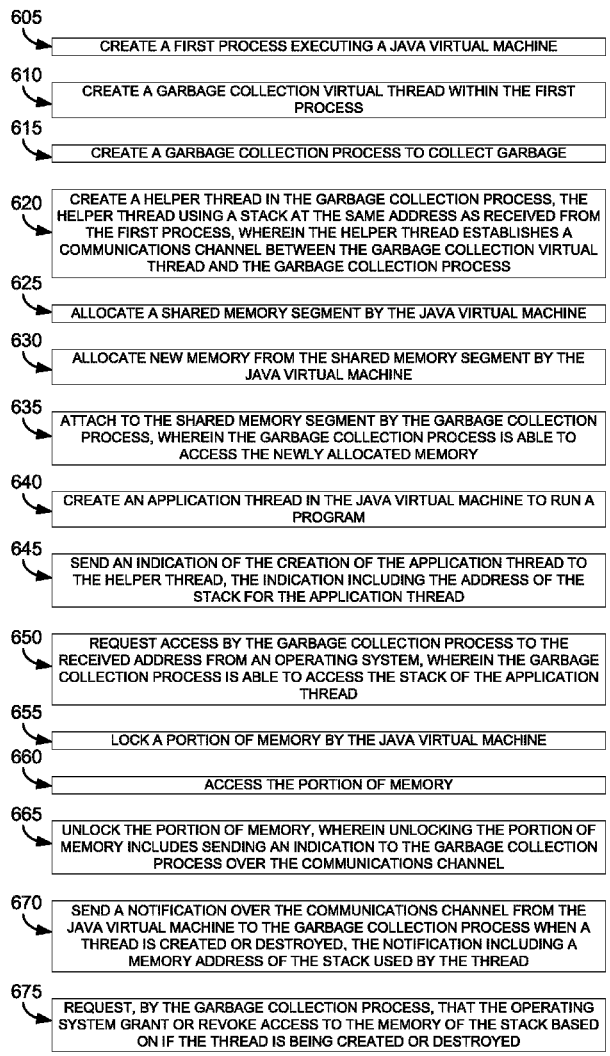
FIG. 6 is another example of a high level flow diagram for creating a JAVA virtual machine utilizing the techniques described herein.

FIG. 6 is another example of a high level flow diagram for creating a JAVA virtual machine utilizing the techniques described herein. In block 605, a first process executing a JAVA virtual machine may be created. In block 610, a garbage collection virtual thread may be created within the first process. In block 615, a garbage collection process may be created. In block 620, a helper thread may be created in the garbage collection process. The helper thread may use the same stack address as the garbage collection virtual thread. The helper thread may establish a communications channel between the garbage collection virtual thread and the garbage collection process.

In block 625, the JAVA virtual machine may allocate a shared memory segment. The JAVA virtual machine may request new memory allocations from the shared segment, as opposed to the heap associated with the JAVA virtual machine. In block 630, new memory may be allocated from the shared memory segment by the JAVA virtual machine. In block 635, the garbage collection process may attach to the shared memory segment. Attaching to the shared memory segment allows the garbage collection process to access any memory newly allocated by the JAVA virtual machine.

In block 640, an application thread may be created in the JAVA virtual machine to run a program. As mentioned above, in JAVA, all programs run as a thread in the JAVA virtual machine. In block 645 and indication of the creation of the application thread may be sent to the helper thread. The indication includes the address of the stack for the application thread. In block 650, the garbage collection process may request the operating system to provide access to the memory address that was received in block 645. Thus, the garbage collection process is able to access the application thread's stack and is able to perform garbage collection functions.

In block 655, a portion of the shared memory segment may be locked by the JAVA virtual machine. For example, data in the shared segment may need to be changed, and it would be problematic if multiple processes and/or threads were attempting to simultaneously change the same data. The lock prevents any thread or process that does not own the lock from accessing the portion of the shared data. In block 660, the portion of memory may be accessed. In block 665, the portion of the memory may be unlocked. Unlocking the portion of the memory includes sending an indication over the communications channel to the garbage collection process to indicate that the lock has been released.

In block 670, a notification may be sent over the communications channel from the JAVA virtual machine to the garbage collection process that a thread is created or destroyed. The notification may include a memory address of the stack used by the thread. In block 675, the garbage collection process may request that the operating system grant or revoke access to the memory address received in block 670 based on if the thread is being created or destroyed.

I claim:

1. A method comprising:
starting, in a computer running an operating system that does not support kernel threads, a virtual machine as a first process;
creating a virtual thread, within the first process, to execute a task comprising returning unused memory of the virtual machine to a memory pool;
creating a second process from the virtual thread, wherein the first process and the second process are each an independent schedulable entity to be run by the operating system and each has a separate address space;
delegating execution of the task to the second process, wherein the delegating comprises passing, by the virtual thread to the second process, an instruction to perform the task;
requesting, by the virtual thread, the operating system to grant, to the second process, access to at least a portion of the address space allocated to the first process; and
executing, by the second process, the task using granted access to the portion of the address space.

2. The method of claim 1, further comprising:
communicating over a communications channel between the virtual thread and the second process, wherein the first process communicates state change information to the second process through the virtual thread over the communications channel.

3. The method of claim 1, further comprising:
allowing, with the operating system, access by the second process to a data portion of a shared library, the shared library used by the first process.

4. The method of claim 1, further comprising:
requesting from the operating system, by the first process, a shared memory segment;
allocating additional memory for the first process, wherein the additional memory is allocated from the shared memory segment as opposed to a memory heap of the first process; and
attaching the second process to the shared memory segment, wherein both the first and second process have access to the additional memory.

5. The method of claim 2, further comprising:
creating a second thread within the first process;
sending, by the virtual thread over the communications channel, an address of a stack allocated for the second thread to the second process, the address in an address space of the first process;
requesting from the operating system, by the second process, access to the address; and
granting, by the operating system, access by the second process to the address.

6. The method of claim 5, further comprising:
sending, over the communications channel, a notification from the first process to the second process that the second thread is terminating;
requesting, by the second process, that the operating system revoke the grant of access by the second process to the address; and
revoking, by the operating system, the grant of access by the second process to the address.

7. The method of claim 4, further comprising:
acquiring, by the first process, a lock of at least a portion of the shared memory segment;
accessing, by the first process, the at least a portion of the shared memory segment;
releasing, by the first process, the lock of the at least a portion of the shared memory segment; and
sending, by the first process, a message over a communications channel indicating the at least a portion of the memory segment is unlocked.

8. The method of claim 4, further comprising:
determining, by the second process, at least a portion of the shared memory segment is locked;
waiting, by the second process, until a message indicating the at least a portion of the shared memory segment is unlocked;
locking, by the second process, the at least a portion of the shared memory segment; and
accessing, by the second process, the at least a portion of the shared memory segment.

9. The method of claim 1, wherein the virtual thread does not execute the task in response to receiving the instruction.

10. The method of claim 9, further comprising:
receiving, by the virtual thread from the second process, an indication that the task has completed at the second process; and
in response to the indication, reporting, by the virtual thread to the first process, the completing of the task.

11. A non-transitory processor readable medium storing instructions, which when executed by a computer cause the computer to:
execute a virtual machine as a first process;
create a garbage collection virtual thread within the first process;
cause, by the garbage collection virtual thread, creation of a garbage collection process executable to perform a task comprising returning unused memory of the virtual machine to a memory pool;
pass, by the garbage collection virtual thread to the garbage collection process, an instruction to perform the task, the passing of the instruction to the garbage collection process causing the garbage collection process to execute the task, each of the first process and the garbage collection process being independently schedulable to run by an operating system that does not support kernel threads;
send, by the first process, an address of a stack created for the garbage collection virtual thread to the garbage collection process;
create a helper thread in the garbage collection process, the helper thread being allocated with the stack at the address received from the first process;
establish, by the helper thread, a communications channel between the garbage collection virtual thread and the garbage collection process; and
execute, by the garbage collection process, the task using access to the stack.

12. The non-transitory medium of claim 11, further comprising instructions to:
create an application thread in the first process to run a program;
send an indication of the creation of the application thread to the helper thread, the indication including an address of a stack for the application thread;
send, by the garbage collection process to the operating system, a request to access the address of the stack for the application thread.

13. The non-transitory medium of claim 12, further comprising instructions to:
lock a portion of memory by the virtual machine;
access the portion of memory by the virtual machine; and
unlock the portion of memory by the virtual machine, wherein unlocking the portion of memory includes sending, by the virtual machine, an indication to the garbage collection process over the communications channel.

14. The non-transitory medium of claim 13, further comprising instructions to:
allocate new memory from a shared memory segment by the virtual machine; and
attach to the shared memory segment by the garbage collection process, wherein the garbage collection process is able to access the new memory.

15. The non-transitory medium of claim 13, further comprising instructions to:
send a notification over the communications channel from the virtual machine to the garbage collection process in response to a thread being created or destroyed, the notification including a memory address of the stack for the garbage collection virtual thread; and
request, by the garbage collection process, that an operating system grant or revoke access to the memory address of the stack based on whether the thread is being created or destroyed.

16. The non-transitory medium of claim 11, further comprising instructions to:
send, by the garbage collection virtual thread, an indication to the operating system to grant, to the garbage collection process, access to a least a portion of an address space allocated to the first process.

17. The non-transitory medium of claim 11, wherein the garbage collection virtual thread does not execute the task in response to receiving the instruction.

18. A device comprising:

a processor; and a non-transitory processor readable medium coupled to the processor, the medium storing instructions that when executed by the processor cause the processor to:

create a virtual machine as a first process;

create a garbage collection virtual thread in the first process;

create a garbage collection process from the garbage collection virtual thread, wherein the first process and the garbage collection process are independent schedulable entities each having a separate address space and each being schedulable to run by an operating system that does not support kernel threads;

establish a communications channel between the garbage collection virtual thread and the garbage collection process, the garbage collection virtual thread to receive an instruction from the first process to perform a task comprising returning unused memory of the virtual machine to a memory pool, the garbage collection virtual thread to pass the received instruction to the garbage collection process to execute the task; and grant, using the operating system, access of the address space allocated to the first process by the garbage collection process, the garbage collection process to execute the task by accessing the address space of the first process.

19. The device of claim 18, wherein the instructions when executed cause the processor to:

share portions of a memory space of the virtual machine with the garbage collection process;

establish a locking mechanism on the portions of the memory space that are shared, wherein the locking mechanism prevents simultaneous access to the portions of the memory space;

notify the garbage collection process of creation of new threads within the virtual machine, wherein the notification includes address information for memory needed by the garbage collection process;

request access by the garbage collection process to the memory;

notify the garbage collection process by the virtual machine of destruction of a thread; and request revocation of access by the garbage collection process to memory that was in use by the destroyed thread.

20. The device of claim 18, wherein the garbage collection virtual thread does not execute the task in response to receiving the instruction.

* * * * *